Sept. 25, 1928.  
E. ADAMS  
1,685,389  
ELECTRIC HEATING ATTACHMENT FOR WINDSHIELD WIPERS  
Filed Feb. 17, 1927  2 Sheets-Sheet 1
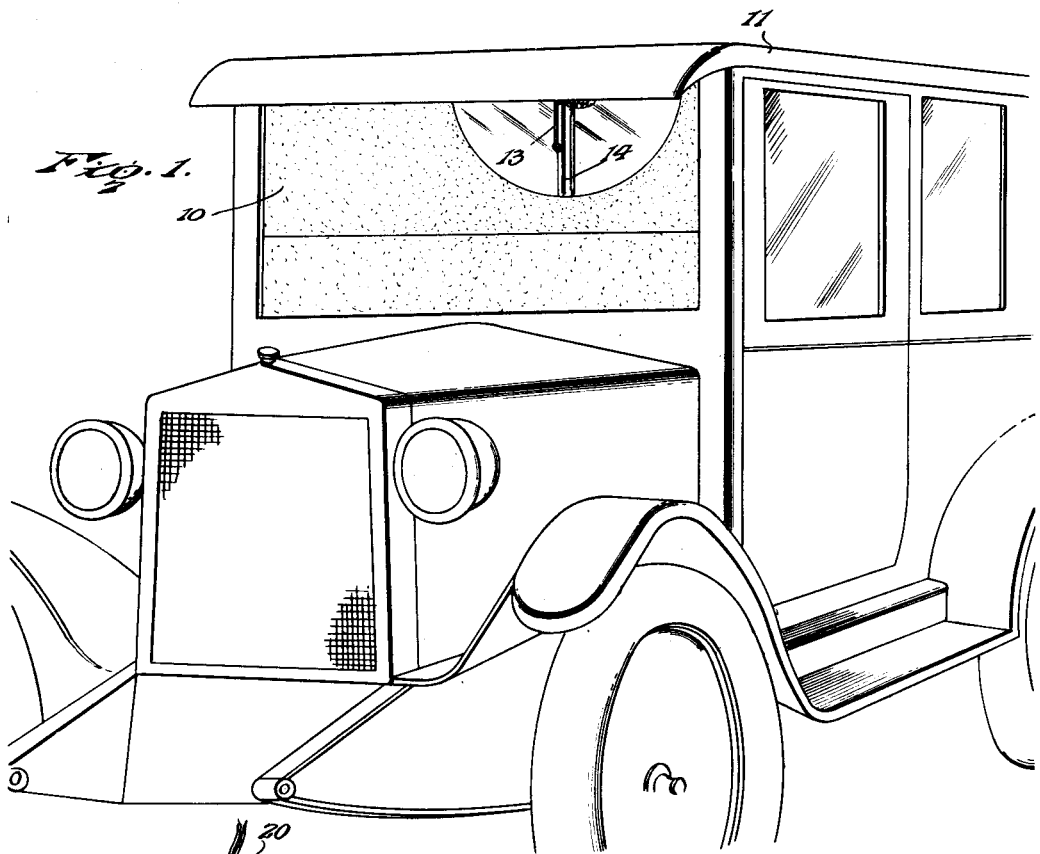
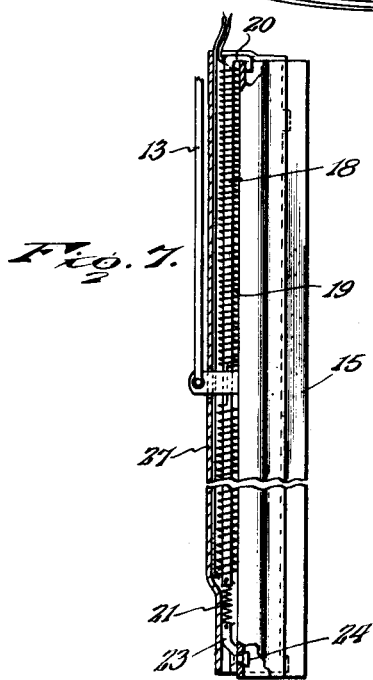
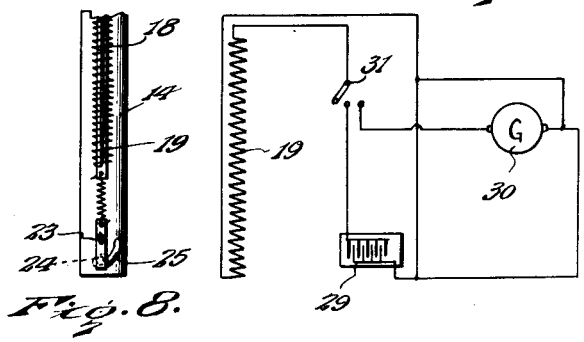
Inventor
Ervin Adams.
By Lacey & Lacey, Attorneys Sept. 25, 1928.  
E. ADAMS  
1,685,389  
ELECTRIC HEATING ATTACHMENT FOR WINDSHIELD WIPERS  
Filed Feb. 17, 1927  2 Sheets-Sheet 2
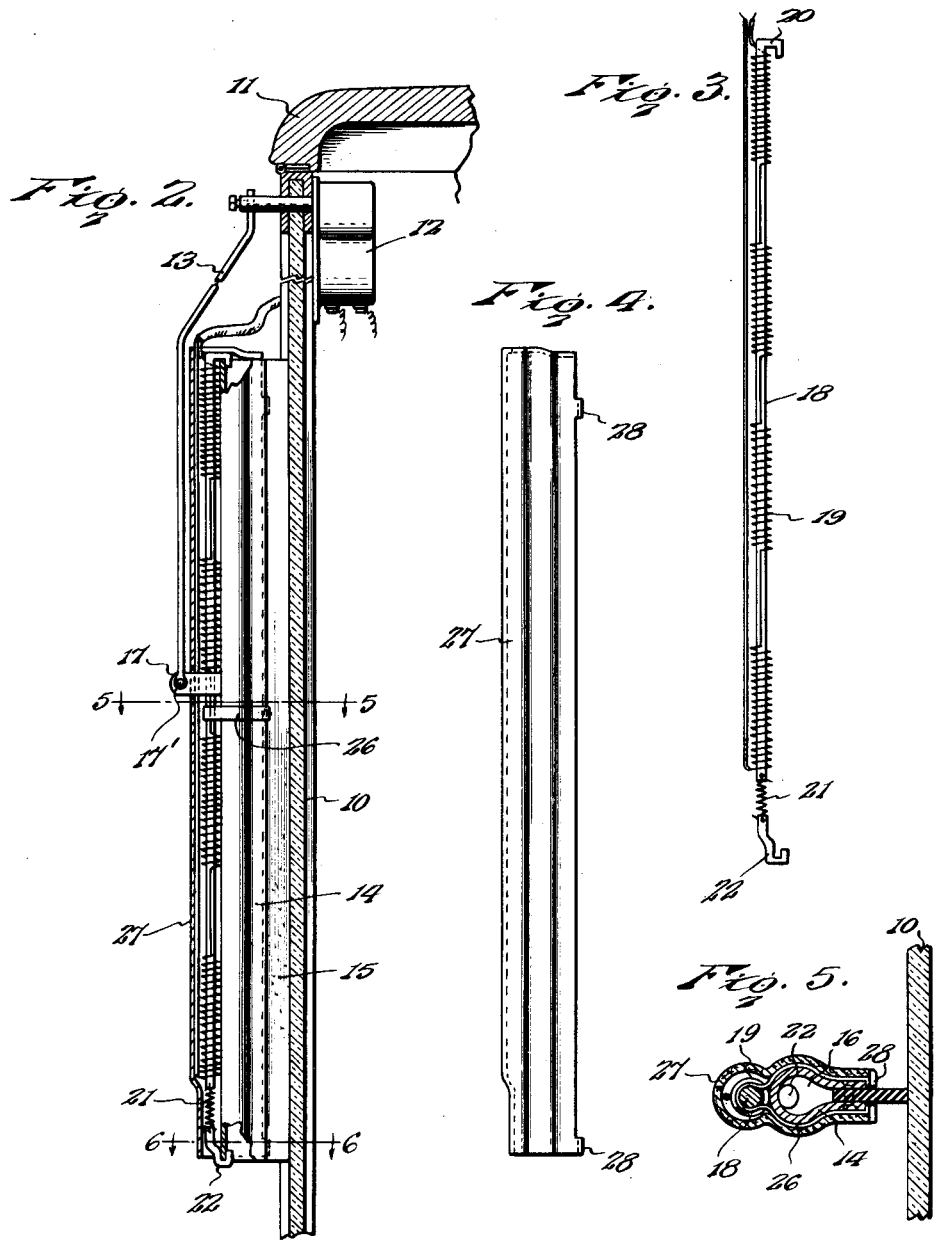
Inventor  
Ervin Adams.
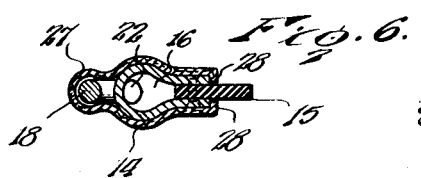
By Lacey & Lacey, Attorneys

UNITED STATES PATENT OFFICE.

ERVIN ADAMS, OF JOHNSTOWN, PENNSYLVANIA, ASSIGNOR, BY DIRECT AND MESNE ASSIGNMENTS, TO THOMAS LOCHRIE AND JOSEPH B. BELL, BOTH OF WINDBER, PENNSYLVANIA.

ELECTRIC HEATING ATTACHMENT FOR WINDSHIELD WIPERS.

Application filed February 17, 1927. Serial No. 169,067.

This invention relates to surface cleaning implements for removing moisture and embodying a head and a flexible strip of rubber, asbestos, or other material suitable for the purpose.

The invention provides an article which is capable of removing ice, snow and sleet from the windshield and windows of vehicles of every description since it includes a heating element whereby the ice is melted and the water removed.

The invention furthermore supplies an appliance in the nature of an attachment which may be easily and quickly substituted for the ordinary windshield wiper of automobiles, as occasion may require, the clear the same of ice in freezing weather.

While the drawings illustrate a preferred embodiement of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a perspective view of an automobile provided with a windshield wiper embodying the invention.

Figure 2 is an enlarged sectional view of the wiper and a portion of the windshield and vehicle top.

Figure 3 is a detail view of the heating element which is adapted to be detachably fitted to the wiper to admit of the removal of ice from the windshield in extreme cold weather.

Figure 4 is an elevational view of the casing for enclosing the heating element.

Figure 5 is a detail sectional view on the line 5—5 of Figure 2.

Figure 6 is a detail sectional view on the line 6—6 of Figure 2.

Figure 7 is a central, longitudinal sectional view of a modified form of wiper.

Figure 8 is a detail view in elevation of an end portion of the wiper with the casing removed.

Figure 9 is a diagrammatic view showing the heating circuit adapted to derive current from a storage battery or generator.

Corresponding and like parts are referred to in the following description and designated in the several views of the drawings by like reference characters.

The numeral 10 designates the windshield of a motor vehicle, and 11 the top to which the windshield is connected in any determinate way. A motor 12 is grovided for operating the wiper and may be of any type, generally employed in connection with automatically operated windshield wipers. An arm 13 is connected at one end to the shaft of the motor, and receives the cleaner which is in the nature of a squeegee and comprises a head 14 and a flexible strip 15 of rubber, asbestos, or other suitable material. In accordance with the invention the squeegee may be of any preferred construction, however, it is preferred to form the head 14 of a strip of material which is folded upon itself intermediate its longitudinal edges and to have the strip 15 secured between the edge portions which are brought together, as indicated most clearly in Figures 5 and 6. The folded portion is spread so as to leave a space 16, as indicated most clearly in Figures 5 and 6. Ears 17 project from the head 14 and detachably receive the arm 13 which may be connected thereto by a pivot bolt 17' or in any suitable manner to admit of ready removal of the device when required.

A heating element is provided as an adjunct of the wiper to admit of snow and ice being readily removed from the windshield, window, or other part to be cleared for unobstructed observation. The heater is adapted to be detachably connected to the wiper, so as to be laid aside when not required for service and to be easily and quickly placed in position as occasion may necessitate. The heater comprises a core 18 and coil 19 wound about the core, and consisting of a siutable wire adapted to offer a resistance to the flow of an electric current, thereby causing the coil to become heated. The coil 19 may consist of a uniform winding, as indicated in Figure 7, or comprise spaced windings, as indicated in Figures 2 and 3. One end of the core 18 terminates in a hook 20 to engage over an end of the hollow head 14, as indicated most clearly in Figures 2 and 7. An engaging device is yieldably connected to the opposite end of the core 18 by means of a contractile helical spring 21, and this engaging device may consist of a hook 22, as indicated most clearly in Figure 2, or a strip 23 provided with a headed stud 24, as indicated most clearly in Figure 7. In the latter case the head 14 is provided with an inclined slot 25 which is enlarged at one end to receive the head of the stud 24 and which is notched at its other end to receive the shank of the stud whereby to retain the heater in place, as indicated most clearly in Figure 8. If necessary, a spring clip 26 may be employed to assist in connecting the heater to the head 14 of the wiper. Longitudinal displacement of the heating coil is prevented by the fastening elements at the ends of the core 18. These fastening elements, besides functioning as confining means for the heating coil, serve as securing means for fastening the heating element to the head to admit of ready detachment of the heater from the head when the device is required for use solely as a wiper. It is also noted that the coils or convolutions of the heating element 19 are freely movable relative to one another, thereby admitting of ready replacement at a nominal cost.

A casing 27 of fiber or other suitable material is provided for enclosing the heater and the head 14 of the wiper, and this casing serves to confine the heat and also to protect the heater and prevent anything from coming in contact therewith. The casing 27 preferably possesses sufficient resiliency to permit it to be retained in place by frictional engagement with the sides of the head 14 and may be formed with ears or clips 28 to engage the edges of the head 14, as shown most clearly in Figures 5 and 6.

The heating coil 19 may be included in a circuit deriving current from a storage battery 29 or a generator 30, and this circuit is adapted to be closed by means of a two point switch 31, thereby admitting of utilizing the current from the battery 29, or the generator 30, as required.

The invention is in the nature of an attachment and includes the squeegee and the heating element and may be substituted for the usual windshield wiper which is detached from the arm 13 and replaced by the combined wiper and heater. It is further observed that the heater is detachably connected to the wiper, thereby admitting of ready replacement of the heater should occasion arise and also permitting the heater to be quickly attached to the squeegee or wiping element of windshield wipers now in general use. The construction of the device also admits of the casing and the heater being removed, so as to be laid aside when not required for long periods.

While the heating attachment is primarily designed for use in connection with windshield wipers, it is, of course, understood that the attachment may be used with equally good results in connection with wiping elements used for cleaning car windows, the windows of houses and public buildings or wherever a device of this kind is found desirable or applicable.

Having thus described the invention, I claim:

1. A windshield wiper comprising a squeegee including a head, a heater detachably connected to said head and comprising a core and a heating coil mounted upon said core, the latter having a hook at one end and an attaching device yieldably connected to its opposite end.

2. A windshield wiper comprising a squeegee including a head, an electric heating element mounted upon the back of the head exterior thereto and a casing enclosing the heater and embracing opposite sides of the squeegee head.

3. A windshield wiper comprising a hollow head, a flexible strip carried by the head and a heater detachably fitted to the back of the head and comprising a core and a heating coil mounted upon the core, said core having a hook at one end and an attaching device yieldably connected to its opposite end.

4. A windshield wiper comprising a hollow head, a flexible strip carried by the head and a heater detachably fitted to the back of the head and comprising a core and a heating coil mounted upon the core, said core having a hook at one end and an attaching device yieldably connected to its opposite end, and a casing enclosing the heater and embracing opposite sides of the head.

5. A heating attachment for a windshield wiper, the same comprising a hollow head, a flexible strip fitted to the said head, an electric heater comprising a core and a heating coil mounted upon the core, the latter having a hook at one end and an attaching device yieldably connected to the opposite end, and a casing detachably fitted to the said head and forming a housing for the heater and embracing opposite sides of the said head.

6. A windshield wiper comprising a hollow head and wiping element, a heater detachably fitted to the back of the head and including a core and spaced heating coils mounted thereon, a spring clip fitting around the core between certain of the heating coils and engaging the hollow head, said core having a hook at one end for engagement with the upper end of the hollow head and an attaching device yieldably connected to its other end and engaging the lower end of the hollow head, and a casing enclosing the heater and embracing opposite sides of the head.

7. A heating attachment for a windshield wiping element including a core having a heating coil mounted thereon, one end of the core being provided with a rigid hook and the other end of the core being provided with a yieldably supported hook whereby to permit the heating attachment to be detachably connected to the windshield wiping element.

8. A heating attachment for a windshield wiping element comprising a core having one end thereof provided with a rigid hook, a heating coil surrounding the core, a movable hook at the other end of the core, a spring forming a connection between the movable hook and said core, and a casing enclosing the heating coil, said hooks being adapted to engage the wiping element to detachably support the attachment in position thereon.

9. A windshield wiper comprising an elongated head, a wiper member carried by the head, a heater element extending along the head and including a coil, the convolutions of which are freely movable relative to one another, and fastening elements at the ends of the heater element readily engageable with and disengageable from corresponding ends of the head to admit of independent use of the wiper, said fastening elements serving to confine the coil of the heating element.

In testimony whereof I affix my signature.

ERVIN ADAMS. [L. S.]